(12) United States Patent  
Zikeli et al.

(10) Patent No.: US 6,644,845 B1
(45) Date of Patent: Nov. 11, 2003

(54) BUFFER STORE FOR POLYMER MELTS, ESPECIALLY CELLULOSE SOLUTIONS

(75) Inventors: Stefan Zikeli, Regau (AT); Michael Longin, Lenzing (AT); Friedrich Ecker, Timelkam (AT)

(73) Assignee: Zimmer A.G., Frankfurt (DE)

( * ) Notice: Subject to any disclaimer, the term of this patent is extended or adjusted under 35 U.S.C. 154(b) by 0 days.

(21) Appl. No.: 10/182,851

(22) PCT Filed: Nov. 20, 2000

(86) PCT No.: PCT/EP00/11524

§ 371 (c)(1),
(2), (4) Date: Oct. 7, 2002

(87) PCT Pub. No.: WO01/58666

PCT Pub. Date: Aug. 16, 2001

(30) Foreign Application Priority Data

Feb. 8, 2000 (DE) .......................................... 100 05 466

(51) Int. Cl.[7] .............................. B01F 15/02; B29B 7/80
(52) U.S. Cl. ................ 366/76.7; 366/76.93; 366/176.3; 425/382.4
(58) Field of Search ................................ 366/76.93, 77, 366/76.7, 76.1, 176.4, 176.3, 190; 425/207, 382.4

(56) References Cited

U.S. PATENT DOCUMENTS 3,706,827 A * 12/1972 Nott et al. ............... 264/176.1
4,711,481 A * 12/1987 Krage et al. ............... 293/133
5,826,978 A * 10/1998 Zikeli et al. .............. 366/176.4

FOREIGN PATENT DOCUMENTS

| DE | 1 914 909 | * | 10/1969 |
| EP | 0 281 314 | * | 9/1988 |
| FR | 2 570 323 | * | 3/1986 |
| GB | 1 262 285 | * | 3/1972 |
| WO | WO 96/05338 | * | 2/1996 |

* cited by examiner

Primary Examiner—Tony G. Soohoo
(74) Attorney, Agent, or Firm—McDonnell Boehnen Hulbert & Berghoff

(57) ABSTRACT

The present invention relates to a buffer tank as is substantially used for ensuring a constant supply of the spinning machine with a polymer melt in spinning machines. To this end the buffer tank is provided with a compensation chamber whose volume is variable in response to a pressure prevailing in the polymer melt and to a volume flow variation. The polymer melt flows from a polymer melt entry opening to a polymer melt exit opening through the compensation chamber. It is the object of the present invention to make the flow through the compensation chamber uniform. The residence time of the polymer melt in the compensation chamber shall thereby be prevented from having a wide range, the latter resulting in an irregular quality of the yarns produced by the spinning machine because of the time-dependent, mechanical and chemical properties of the polymer melt. To achieve said object, the compensation chamber is provided for flow optimization with at least to one flow guiding element projecting into the flow of the polymer melt, which is smaller than the flow cross-section of the compensation chamber and by which the velocity profile in the direction of flow through the compensation chamber is made uniform at least in sections.

24 Claims, 4 Drawing Sheets

BUFFER STORE FOR POLYMER MELTS, ESPECIALLY CELLULOSE SOLUTIONS

The present invention relates to a buffer tank for supplying an extrusion device with a polymer melt in a substantially constant manner, the buffer tank comprising at least one polymer melt entry opening, at least one polymer melt exit opening, and at least one compensation chamber that is arranged between polymer melt entry opening and polymer melt exit opening and has the polymer melt flowing therethrough, and whose volume is variable in dependence upon a pressure prevailing in the polymer melt.

Such buffer tanks are generally used in extrusion devices which must be fed with a mostly high-viscosity polymer melt at a constant pressure, if possible. A special use of such buffer tanks for extrusion devices is encountered in the textile industry in the field of spinning systems and spinning machines, where the polymer melt is a spinning solution consisting of cellulose, amine oxides, such as N-methylmorpholine-N oxide (NMMO), and water. The spinning solution is spun by the spinning machines into yarns. Other applications of the buffer tank can be found in blow molding machines and in deep-drawing and injection-molding machines.

In spinning machines the quality of the yarns essentially depends on a constant supply of the polymer melt to the spinning machine. To ensure that the spinning machine is constantly fed with polymer melt, buffer tanks are used to compensate for variations in volume flow and pressure in the supply line of the polymer melt by varying the volume of a compensation chamber in the buffer tank in dependence upon a volume flow and/or pressure variation in the polymer melt.

However, the use of a buffer tank creates new problems. The mechanical and chemical characteristics of the polymer melts, e.g. a cellulose solution, are time-dependent and vary in response to the respective residence time of the polymer melt in the buffer tank and in the supply line to the spinning machine. To obtain a uniform spinning quality, it must therefore be ensured that the polymer melt flows at a uniformly rapid speed through all areas of the buffer tank, if possible.

Problems arise when the polymer solution is a high-viscosity fluid and flows at relatively slow flow speeds through the buffer tank. On account of the low flow speed and the high viscosity, the flow of the polymer melt through the buffer tank is predominantly laminar.

The laminar flow is above all critical in view of the time dependence of the characteristics of the materials: On the one hand, the flow speed considerably drops in a laminar flow near walls; on the other hand, a laminar flow is very likely to separate. When a flow separates in the buffer tank, dead water zones or recirculation zones are formed. These two groups of problems—irregular speed distribution and flow separation—effect different residence times of the polymer melt in the buffer tank. As a consequence, the chemical and mechanical characteristics of the "aged" polymer melt which flows through the areas of the buffer tank at a slower flow speed and thus remains in the buffer tank for a longer period of time are changed in comparison with a polymer melt flowing through the buffer tank at a fast speed.

The areas of separation of the polymer melt flow are flushed at least in part from time to time by the speed variations always observed during conveyance of the polymer melt, and because of the unsteady characteristics thereof. In the end, the polymer melt which has been trapped there for some time and has "aged" thus passes to the spinning machine and is spun in said machine, whereby the quality of the spun yarns varies considerably.

A measure for making the flow through the buffer tank uniform consists, according to WO 94/02408, in installing stirrers for actively transporting and mixing the flow through the buffer tank. Thanks to the mixing action the speed profile of the flow is made uniform and dead water and recirculation zones are avoided. However, the drive for driving the stirrers consumes a lot of energy, not least because of the high viscosity of the polymer melt. With an inaccurate design of the stirrer, there is the risk that the polymer melt heats up. Without expensive counter-measures, the chemical and mechanical properties of the polymer melt would change in such a case under the action of heat.

FR 2570323 relates to a device for supplying a low-viscosity elastomer at a predetermined constant throughput. The throughput is also to be achieved in cases where the supply with elastomer is briefly interrupted. The device is above all to be used for making connections for multiple glazings. In the device of FR 2570323, the elastomer is stored in a tank of a variable volume, a biased cylinder with a piston being arranged in the interior of the tank. In the stroke direction of the piston, a channel is passing therethrough for guiding the low-viscosity elastomer through the tank. A pump with two compression means is located at the outlet of the reservoir.

WO 96/05338 shows a buffer tank through which the polymer melt flows in axial direction. Behind the polymer melt entry opening, the compensation chamber is expanded in a diffusor-like manner. The compensation opening tapers towards the polymer melt exit opening in the manner of a nozzle. The volume prevailing between the diffusor section and the nozzle section can be increased or reduced in response to the necessary filling level in the polymer melt.

The polymer melt flow is very likely to separate because of the diffusor and the nozzle. Therefore, commercially available static mixer elements are installed in the compensation chamber of the buffer tank of WO 96/05338 for making the flow uniform and for preventing separation tendencies. The static mixer elements extend over the total cross-section of the compensation chamber.

The volume of the compensation chamber, however, must be increased considerably, so that the static mixer elements can be received therein. Therefore, the buffer tank with the static mixers may become too large for many applications. Moreover, on account of the long flow path and the large dimensions of the static mixer elements, the flow resistance of the buffer tank is increased many times, thereby increasing the amount of energy needed for conveying the polymer melt. This enhances the risk of a heating up of the polymer melt.

The buffer tank of WO 96/05338 has the drawback that the flow in the area of the diffusor and the nozzle tends to separate in cases where the angle of opening of diffusor and nozzle, respectively, becomes too large. This risk arises above all in the case of a slow flow of the high-viscosity polymer melt. In the separated flow, a separation whirl is formed, as well as dead water zones in which the high-viscosity polymer melt stagnates. Moreover, a new design and calculation of the opening angle are always needed for different flow conditions in different systems because the separating action depends on the speed of the flow.

In view of these drawbacks it is the object of the present invention to provide a buffer tank with improved fluid dynamics and to take measures for obtaining a uniform flow through the buffer tank, whereby the constructional size and the flow resistance of the buffer tank are not changed or only changed to an insignificant degree.

According to the invention this object is achieved for a buffer tank of the above-mentioned type in that the compensation chamber between the polymer melt entry opening and the polymer melt exit opening is divided into at least two partial chambers extending in the direction of flow.

Such a solution is simple and has the advantage that a diffusor-like enlargement and a nozzle-like narrowing of the flow cross-section can be dispensed with: Since the compensation chambers are divided into at least two partial chambers, the flow cross-section of the partial chambers can remain small so that a great discontinuous change in cross section is no longer required with respect to the polymer melt entry opening and the polymer melt exit opening. As a consequence, the tendency to form regions of separation is considerably reduced in the inventive design of the buffer tank in comparison with the prior art. The total flow cross-section formed by the two partial chambers is nevertheless relatively large, so that the flow resistance of the buffer tank is small. The constructional size of the buffer tank can be maintained in unchanged form.

According to a further advantageous development the discontinuous change in cross-section will become particularly small in cases where in a normal operative state of the buffer tank the flow cross-section of each partial chamber substantially corresponds to the flow cross-section of the polymer melt entry opening and/or the polymer melt exit opening. The buffer tank will then be in its normal mode of operation whenever the polymer melt is supplied to the spinning machine without trouble and the volume of the compensation chamber is substantially identical with the volume of the compensation chamber averaged over a long period of operation. Around this mean value the volume of the compensation chamber will vary upon a rise or drop in pressure and upon volume flow variations in the polymer melt.

For changing the volume of the compensation chamber a wall of the compensation chamber may be formed by a piston at least sectionwise. Said piston is movable in the buffer tank, and the volume of the compensation chamber is variable by its movement. In a further advantageous development a fluid-filled, i.e. a gas- or liquid-filled, piston chamber may be provided with a fluid supply line and a fluid discharge line at the side of the piston which faces away from the compensation chamber. Said piston chamber can be acted upon with an adjustable pressure through which the pressure in the compensation chamber, i.e. the pressure prevailing in the polymer melt, or the volume of the compensation chamber can be varied. Air can be discharged from the piston chamber via the fluid discharge line in case of a rise in pressure or volume flow in the polymer melt and an accompanying increase in the volume of the compensation chamber. Air is supplied via the fluid supply line into the piston chamber upon a decrease in volume of the compensation chamber.

Alternatively, or in addition to the fluid-filled piston chamber, a mechanical spring element may be provided for producing a spring force acting on the piston.

In a further development the piston may be connected to a displacement sensor by which a signal can be output. The volume of the compensation chamber can be calculated by the signal. This signal can be supplied to a data processing system for monitoring a spinning machine system, of which the buffer tank forms a part.

In a further advantageous development the compensation chamber may be designed as an annular chamber, and the piston accordingly as an annular piston.

When the compensation chamber is formed as an annular chamber, it is of advantage when the polymer melt entry opening and the polymer melt exit opening are arranged on diametrically opposite regions of the annular chamber. The annular compensation chamber is thus divided into two partial chambers of equal length that ensure a flow duration of equal length, independently of the partial chamber through which the polymer melt is flowing.

In a further advantageous development the polymer melt entry opening and/or the polymer melt exit opening can terminate in axial direction, i.e. in the direction of a symmetrical axis of the annular chamber, in the annular chamber. With such a design the buffer tank can easily be integrated into an existing pipe system. This design is in particular of advantage in combination with a piston if the polymer melt entry opening an/or the polymer melt exit opening are arranged in the compensation chamber to be opposite to the piston: Even with the smallest volume in the compensation chamber, the polymer melt entry opening and/or the polymer melt exit opening cannot be covered by the piston that is movable in the buffer tank.

Installation and removal of the buffer tank into and from an existing pipe system are easy if according to a further advantageous development the polymer melt entry opening and the polymer melt exit opening are arranged at the same side of the annular chamber. With this design the connections of the buffer tank are positioned at one side and are thus easily accessible.

The object underlying the invention is also achieved according to the invention for a buffer tank of the above-mentioned type by the measures that the compensation chamber is provided with at least one flow guiding element projecting into the flow of the polymer melt for optimizing the flow. The element is here smaller than the flow cross-section of the compensation chamber and makes the velocity profile uniform—at least in sections—in the direction of flow through the compensation chamber. When flow guiding elements are used, a division of the compensation chamber into partial chambers can also be dispensed with.

With such a design the flow guiding element permits a targeted action on critical portions of the flow in the buffer tank, i.e. on those zones in which separation tendencies are observed or in which the speed profile over the flow cross-section is very irregular, i.e. exhibits great differences in speed.

For influencing a critical flow region inside the compensation chamber in a targeted manner, only a small flow guiding element is needed. The constructional size of the flow guiding element can be determined by one skilled in the art in simple experiments, i.e. adapted to the respective individual case. Starting from a specific size of the flow guiding element with which a uniform flow is achieved in a reliable manner in a selected critical region and the occurrence of irregular speed distribution or separation is reliably avoided, the flow guiding element is made successively smaller. With each new constructional size of the flow guiding element, it is determined numerically or experimentally whether the desired flow-optimizing effect is still achieved. The minimum size of the flow guiding element is the constructional size at which a flow optimization is still observed, i.e. a flow that is made uniform, as well as the prevention of separation and recirculation areas in the selected critical region. The constructional sizes obtained through such test series for the flow guiding element are surprisingly small and will not hinder the core flow through the compensation chamber to any significant extent because they only occupy a small part of the flow cross-section.

Thus, in contrast to the static mixers known from the prior art, which entirely fill the compensation chamber and act on the whole flow through the buffer tank, there is only a locally defined action on the flow according to the invention. The flow guiding element required for such a local action on the flow and for flow optimization is quite small in comparison with static mixers. Thus, upon use of the flow guiding elements of the invention the constructional size of the buffer tank remains substantially unchanged.

The recovery of flow losses achieved by avoiding recirculation zones and dead water zones are in the order of the flow resistance of the flow guiding element, so that the flow resistance of the buffer tank is not increased. Sometimes a reduction of the flow resistance of the buffer tank is even possible.

In the region of separation, in the recirculation zones and the dead water zones, the speed considerably decreases in comparison with the core flow of the polymer melt through the compensation chamber and may even assume negative values. A flow opposite to the flow through the buffer tank, a so-called reverse flow, will then be observed locally.

According to a particularly advantageous development of the invention the flow guiding element may be arranged near a region of the compensation chamber in which a separation or a strong drop in speed occurs in the polymer melt flow. Without a flow guiding element installed in the compensation chamber, these regions can readily be detected by one skilled in the art either experimentally or numerically. When the flow guiding element is placed in the compensation chamber, a flow optimization is effected by the same in a targeted manner in these regions.

In particular in regions in which the flow lines, i.e. the extension of the flow through the compensation chamber, has a strong curvature, there is the risk of separation and of the formation of large vortices in the case of a laminar flow. Therefore, in a further advantageous development, the flow guiding element may be arranged in a region of the compensation chamber in which the flow through the compensation chamber has a strong curvature. The flow guiding elements may be made integral as separate members secured within the compensation chamber, or to the walls of the compensation chamber, as part of a housing or piston of the buffer tank.

Other flow conditions that pose problems for a uniform flow through the compensation chamber may ensue if the compensation chamber has a flow cross-section forming at least one corner. In such a corner a delayed corner flow may form during flow through the compensation chamber. To accelerate the corner flow, thereby avoiding an excessively long residence time of the polymer melt in the corners, the flow guiding element may be arranged in the area of the corner in a further advantageous development. In this arrangement the corner flow forming during flow through the compensation chamber is made uniform by the flow guiding element. This can e.g. be accomplished by the measure that the corners are provided with a flow guiding element which rounds off the corners of the compensation chamber in a manner of benefit to the flow.

The areas in which the polymer flows into and out of the compensation chamber may in particular effect an irregular flow in cases where the polymer melt entry opening and the polymer melt exit opening are arranged in the direction of the axis of symmetry of the annular chamber. In such a case a wall of the compensation chamber which is directly opposite to the polymer melt entry opening is then flown at directly by the polymer melt flowing into the compensation chamber, which results in an irregular speed profile in the area of the polymer melt entry opening. In the outflow area out of the compensation chamber, the flows from the two partial chambers impinge on one another and must be deflected. To optimize the flow in such cases, the flow guiding element may be arranged according to a further advantageous development on the wall of the compensation chamber that is opposite to the polymer melt entry opening and/or the polymer melt exit opening.

The flow guiding element may substantially assume the shape of a preferably radially symmetrical nose oriented towards the polymer melt entry opening. The flow from the polymer melt entry opening into the compensation chamber is divided by said nose in a manner of advantage to the flow and is guided in the direction of the compensation chamber without separation of the flow of the polymer melt or a recirculation.

Alternatively, or in addition to said development, the flow guiding element in a further advantageous development may substantially have the shape of a preferably radially symmetrical nose oriented towards the polymer melt exit opening. In this development the flow out of the compensation chamber is also guided gradually and without the formation of dead water zones and recirculation zones towards the polymer melt exit opening.

In a development of the buffer tank according to the invention the nose may be arranged on the piston.

The flow guiding element may be designed in the form of a blade or a wing in a further advantageous development. These developments of a flow guiding element can influence the flow through the buffer tank in critical areas in a targeted manner. The flow guiding element may e.g. be designed as a flow guiding blade. Such a flow guiding blade guides the rapid core flow into areas of a slow flow or produces, in its trail, a vortex which thoroughly mixes the flow and makes the same uniform.

The present invention also relates to a kit for an extrusion system consisting of an extrusion machine for extruding the polymer melt and of at least one pump means for conveying the polymer melt to the extrusion machine.

The above-mentioned object is achieved in such a kit with a buffer tank according to one of the aforementioned advantageous developments.

In particular, the extrusion machine may be a spinning machine for spinning the polymer solution. In this instance the polymer melt may be a spinning solution, in particular a cellulose solution with NMMO.

To ensure a uniform supply of the polymer melt to the at least one pump means, it is of advantage when the buffer tank is arranged in the conveying direction of the polymer melt in front of said at least one pump means.

The construction and function of the buffer tank according to the invention shall now be explained with reference to two embodiments.

First of all, the design of the embodiment of FIGS. 1 and 2 will be described.

Figure 1:
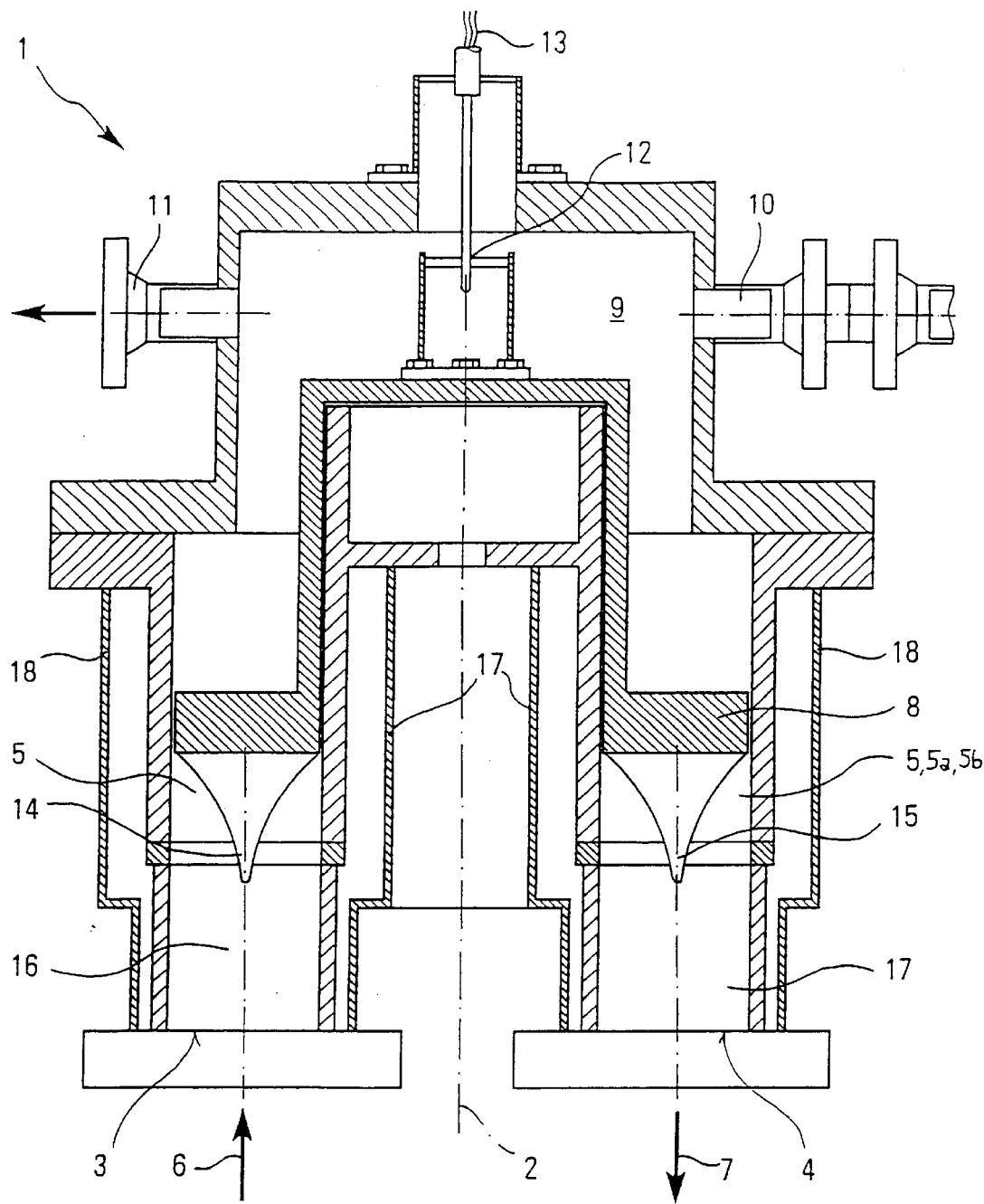
FIG. 1 shows a first embodiment of a buffer tank according to the invention in a first radial section.

FIG. 1 shows a buffer tank 1 which is designed to be substantially rotationally symmetrical about a longitudinal axis 2. The section of FIG. 1 extends in diametrical fashion through the polymer melt entry opening 3 and the polymer melt exit opening 4. The polymer melt entry opening 3 and the polymer melt exit opening 4 are arranged to be diametrical to one another at a side of an annular compensation chamber 5. In the embodiment of FIG. 1, the longitudinal axes of the polymer melt entry opening 3 and the polymer melt exit opening 4 extend in parallel with the longitudinal axis 2. Thus the polymer melt entry opening 3 and the polymer melt exit opening 4 terminate in perpendicular fashion in the compensation chamber 5.

Behind the polymer melt entry opening, the compensation chamber 5 is divided in the direction of flow into two partial chambers 5a and 5b. The partial chambers 5a and 5b extend in the direction of flow of the polymer melt through the compensation chamber. In the embodiment there are provided two partial chambers 5a, 5b that are bent like a segment of a circle and jointly form a continuous annular chamber 5. The cross section of each partial chamber 5a, 5b in the normal operative state of the buffer tank corresponds approximately to the cross section of the polymer melt entry opening 3 and the polymer melt exit opening 4. Since the cross sections of polymer melt entry opening 3 and polymer melt exit opening 4 and of each partial chamber 5a, 5b are about the same, discontinuous cross-sectional changes that might lead to a separation of the polymer melt flow are avoided. At the same time, the total flow cross-section of the two partial chambers 5a, 5b is so large that the polymer melt slowly flows through the buffer tank 1. A laminar and constantly uniform flow through the buffer tank 1 is obtained due to the low flow speeds and the high-viscosity of the polymer melt. This reduces the flow resistance of the buffer tank.

A high-viscosity polymer melt, preferably consisting of cellulose, water and amine oxide, enters through the polymer melt entry opening 3 in the direction of arrow 6 into the compensation chamber 5. After having flown through the compensation chamber 5, the polymer melt exits in the direction of arrow 7 through the polymer melt exit opening 4. Furthermore, the buffer tank 1 is provided with an annular piston 8 which is displaceably held in the buffer tank 1 in the direction of the longitudinal axis 2. The volume of the compensation chamber 5 can be varied in response to the position of the annular piston 8.

FIG. 1 shows the buffer tank 1 in the normal operative state in which the buffer tank 1 is normally operated and around which the volume of the compensation chamber 5 varies.

At the side of the annular piston 8 which faces away from the compensation chamber, the buffer tank 1 is provided with a sealed piston chamber 9. The piston chamber 9 is provided with a fluid supply line 10 and a fluid discharge line 11 through which a fluid, i.e. a gas or a liquid, is supplied or discharged, depending on the position of the annular piston 8. The piston chamber 9 can also be acted upon via the supply line 10 and the discharge line 11 with a predetermined pressure which will then act on the polymer melt in the compensation chamber 5. Instead of a design with the piston chamber 9 and with the supply and discharge lines 10, 11, there may be provided a mechanical spring element acting on the piston 8.

Furthermore, the annular piston 8 is provided with a displacement sensor 12 by which the instantaneous position of the annular piston 8 can be sensed and passed on via a signal line 13 in signal form to a data processing system (not shown). In the data processing system, the actual volume of the compensation chamber 5 can be determined or calculated through the signal of the displacement sensor 12.

Moreover, the buffer tank 1 is provided with a pressure sensing element (not shown) through which the pressure prevailing in the piston chamber 9 can be sensed and output in signal form. Furthermore, the buffer tank has provided therein a thermometer (also not shown) by means of which the temperature of the polymer melt and/or the temperature in the piston chamber 9 can be sensed.

In the area of the polymer melt entry opening 3 the buffer tank is provided with a flow guiding element 14. The flow guiding element 14 is designed in the form of a nose which extends in the direction of the longitudinal axis 2 and is oriented towards the polymer melt entry opening 3 and tapered in said direction. Such a nose 15 is also found in the polymer melt exit opening 4. The nose 15 is also designed to converge in the direction of the longitudinal axis 2 towards the polymer melt exit opening 4. The two flow guiding elements 14, 15 are arranged to be coaxial to the axes 16, 17 of the polymer melt entry opening 3 and the polymer melt exit opening 4 and are each provided with circular cross-sections perpendicular to said axes 15, 16.

A heating jacket 18 which surrounds the compensation chamber on the inside and outside is provided for stabilizing the temperature of the polymer melt inside the buffer tank 1. A fluid flows through the heating jacket 18 at a predetermined, adjustable and controlled temperature.

Figure 2:
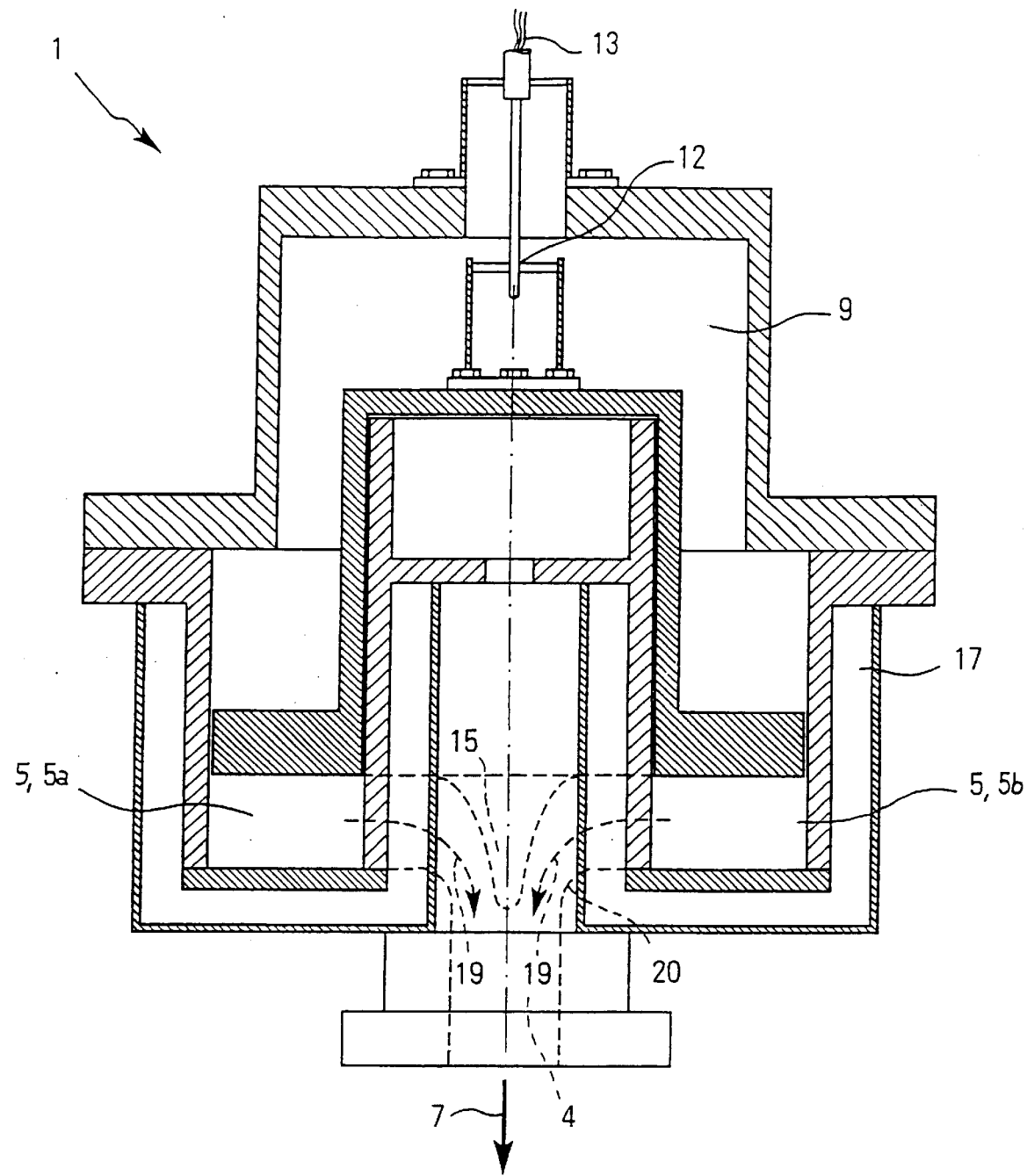
FIG. 2 shows the embodiment of FIG. 1 in a second radial section perpendicular to the radial section of FIG. 1.

FIG. 2 shows the embodiment of FIG. 1 in a radial section perpendicular to the radial section of FIG. 1 with a view on the flange-shaped polymer melt exit opening 4.

The function of the flow guiding elements 14, 15 of the invention shall now be explained with reference to FIG. 1 and FIG. 2.

In the transitional region from the polymer melt entry opening 3 and the polymer melt exit opening 4 to the compensation chamber 5 the polymer melt flows in vertical fashion into the compensation chamber 5 and must be deflected. To divert the flow of the polymer melt in said transitional regions without any loss, if possible, and without the formation of dead water zones, and to make the flow uniform, a respective flow guiding element 14, 15 is provided in said regions, as explained above, in the form of a nose. The flow is guided by the nose 14 without the formation of a dead water zone or a backflow towards the compensation chamber 5.

Likewise, in the area of the polymer melt exit opening 4 the flow of the polymer melt is guided by the nose 15 in a uniform manner into the polymer melt exit opening 4 without the formation of vortices causing losses and without the generation of a backflow or a dead water zone 5. This is schematically shown in FIG. 2 by arrows 19.

The shape of the flow guiding elements 14, 15 can be optimized in dependence upon the respective geometry of the compensation chamber and the entry and exit openings, the respective volume flow and the respective viscosity of the polymer melt by way of simple experimental tests, such as flow visualizations, in the case of which vortices and dead water zones are made visible, or by way of computing programs. To this end the edges 20 between the compensation chamber 5 and the polymer melt entry opening 3 and the polymer melt exit opening 4, respectively, may also be rounded. A separation of the polymer melt flow at edges 20 is thereby avoided.

In comparison with the flow cross-section of the compensation chamber 5 the flow guiding elements 14, 15 constitute small baffles which only influence the flow through the compensation chamber 5 in the area of the polymer melt entry opening 3 and the polymer melt exit opening 4, respectively, and which do not hinder the core flow through the compensation chamber 5. They help to make the velocity profile of the passage flow substantially uniform and to reduce the flow losses caused by vortices.

Since dead water zones and backflow or recirculation zones are avoided, it is possible with the flow guiding elements 14, 15 to achieve a flow through the compensation chamber 5 with an almost constant residence time of the polymer melt in the buffer tank 1. Moreover, thanks to the small constructional shape of the flow guiding elements 14, 15, the flow resistance produced by these elements is compensated by recovery of the flow losses. The flow guiding elements 14, 15 are so small that they can be incorporated into already existing buffer tanks 1 without further modifications.

Figure 3:
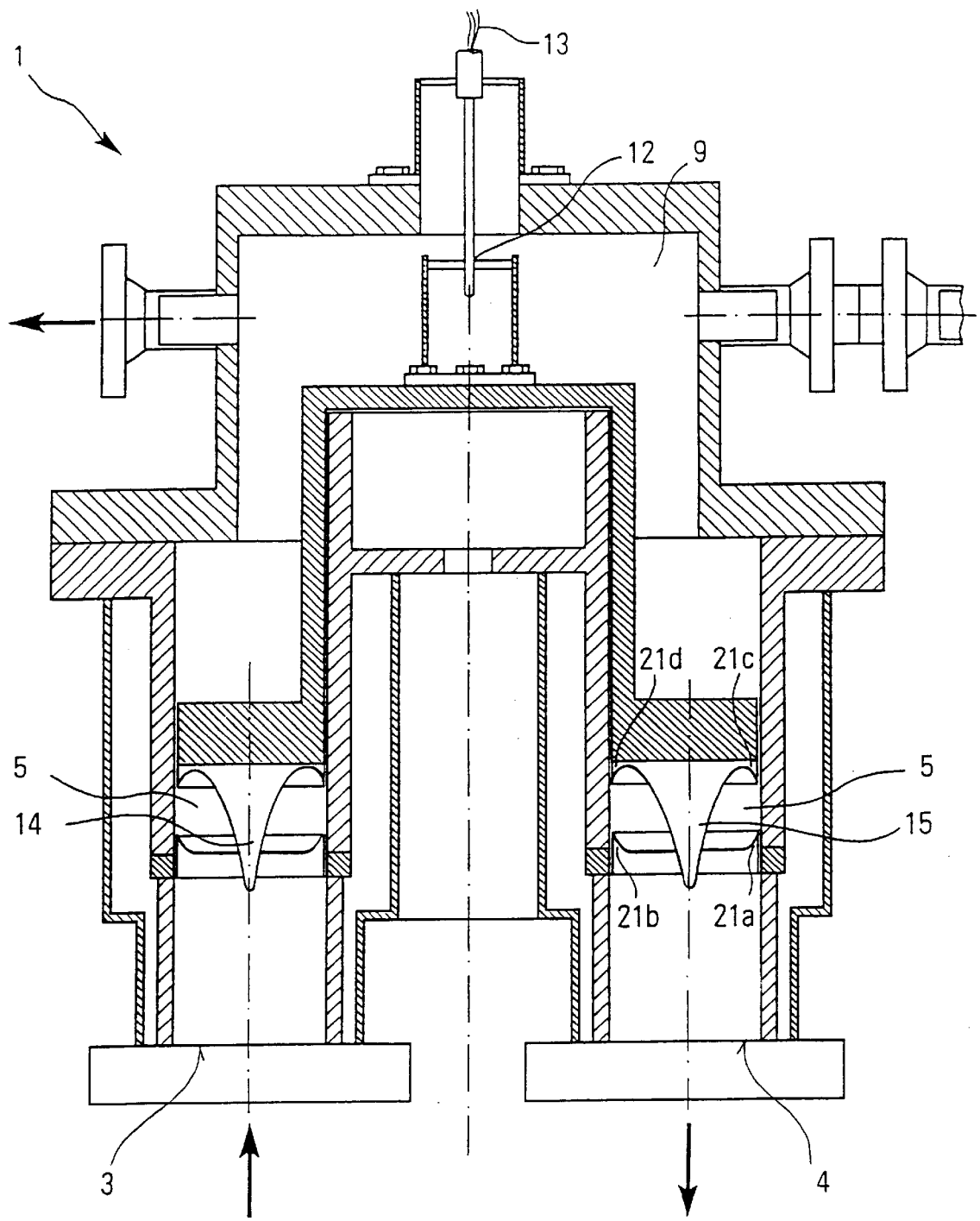
FIG. 3 shows a second embodiment of the buffer tank according to the invention in a radial section.
Figure 4:
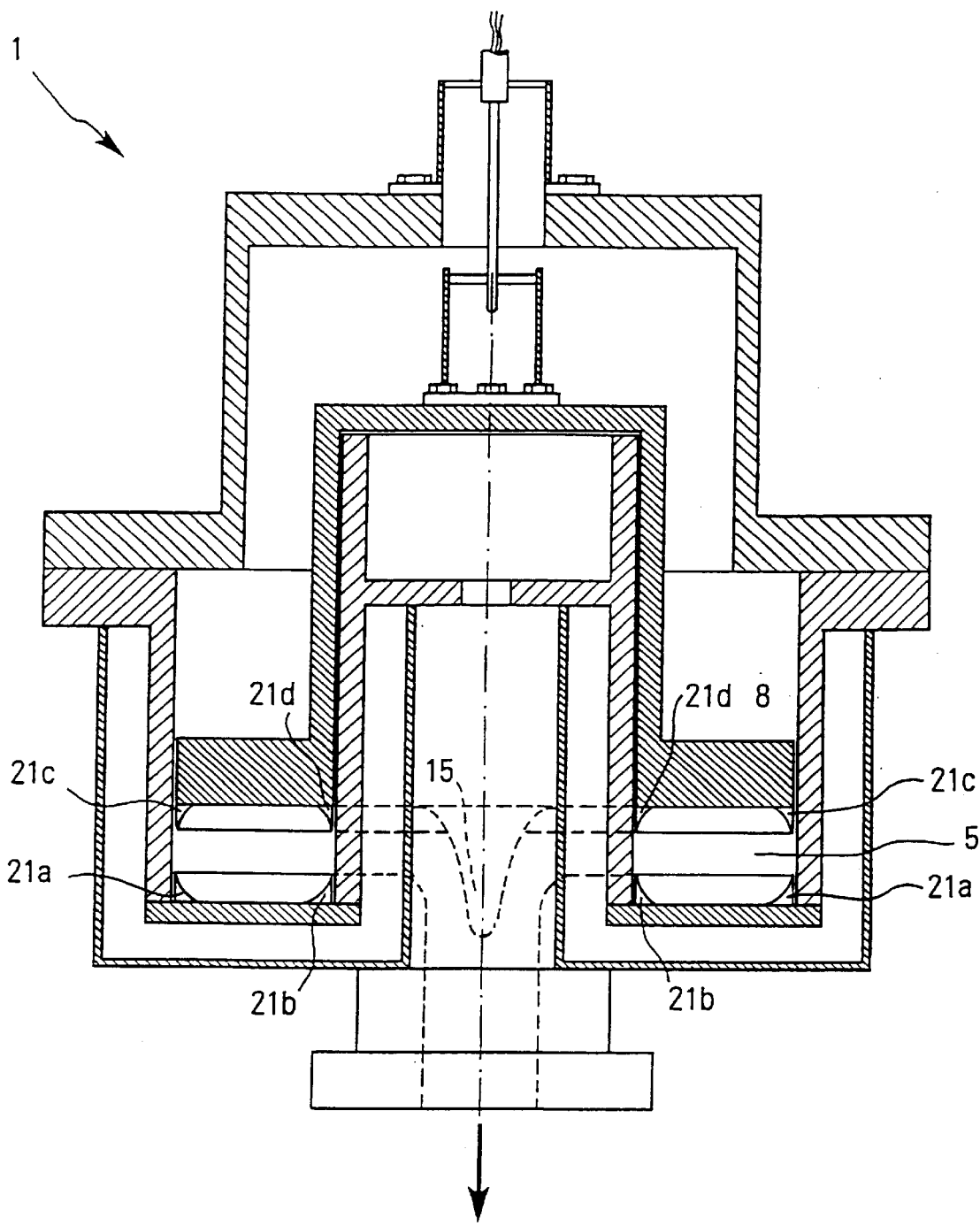
FIG. 4 shows the embodiment of FIG. 3 in a second radial section perpendicular to the radial section of FIG. 3.

A further embodiment of a buffer tank according to the invention with flow-optimizing flow-guiding elements is illustrated in FIGS. 3 and 4 in the same sectional views as in FIGS. 1 and 2. For identical or similar constructional elements, the same reference numerals are used as in FIGS. 1 and 2.

The embodiment of FIGS. 3 and 4 differs from the embodiment of FIGS. 1 and 2 substantially by additional flow guiding elements provided in the corners of the compensation chamber. These flow guiding elements are to prevent the formation of a corner flow. In the corners, flow through the compensation chamber 5 is considerably delayed. Hence, there is the risk that the polymer melt will age in the corners.

As a rule, various measures can be taken for varying the corner flow, e.g. a fast flow can be guided by blade- or wing-like flow guiding elements from the core flow through the compensation chamber 5 towards the corners. According to the inventors' knowledge these measures are also unknown in prior-art buffer tanks.

A different method is however adopted in the embodiment of FIGS. 3 and 4. As can be seen in FIG. 4, a rounded flow guiding element 21a, 21b, 21c and 21d which is filling the corner is arranged in each corner of the rectangular flow cross-section of the compensation chamber 5. These flow guiding elements that are assigned to the corners of the flow cross-section prevent the formation of a slow corner flow. The radius of curvature of the flow guiding elements can easily be determined by way of experiments or numerically by carrying out a flow visualization or a resistance measurement.

Each of the flow guiding elements 21a–d extends in the circumferential direction of the annular chamber in annular fashion in the corresponding corner. The two upper flow guiding elements 21c and 21c are fastened to the piston 8 and will move upwards and downwards with said piston in dependence upon the volume of the compensation chamber 5. The flow guiding elements 21a–d can also be retrofitted into existing buffer tanks.

In the area of the polymer melt entry opening 3 and the polymer melt exit opening 4, the flow guiding elements 21a–d preferably cooperate with the noses 14 and 15 mounted thereat by passing smoothly on the inner edge and the outer edge into noses 14, 15, as shown in FIG. 3. The flow guiding elements 14, 15 have the same effect as in the embodiment of FIGS. 1 and 2. Their function need therefore not be discussed again for the second embodiment.

In the embodiment shown in FIGS. 3 and 4, the flow guiding elements 21a–d are also small in comparison with the flow cross-section of the compensation chamber 5. Their flow resistance is in the order of the recovery of the flow losses of the corner flow. Thus, they do not increase or only insignificantly increase the flow losses in the buffer tank 1, and they do also not enlarge the constructional size of the buffer tank 1.

In the area of the polymer melt entry opening 3 and the polymer melt exist opening 4, where the flow is strongly curved, a smooth transition of the respectively lower flow guiding elements 21a and 21b to the polymer melt entry opening 3 and the polymer melt exist opening 4, respectively, may be formed as shown in FIG. 4.

What is claimed is:

1. A buffer tank for supplying an extrusion device, with a polymer melt, in a substantially constant manner, comprising at least one polymer melt entry opening, at least one polymer melt exit opening and at least one compensation chamber of variable volume that is arranged between the polymer melt entry opening and polymer melt exit opening and has the polymer melt flowing therethrough, wherein the compensation chamber between the polymer melt entry opening and the polymer melt exit opening is divided into at least two partial chambers extending in the direction of flow.

2. The buffer tank according to claim 1, wherein in a normal operative state of the buffer tank the flow cross-section of each partial chamber corresponds substantially to the flow cross-section of the polymer melt entry opening and/or the polymer melt exit opening.

3. The buffer tank according to claim 1, wherein the partial chambers have substantially identical flow cross-sections.

4. The buffer tank according to claim 3, wherein the partial chambers extend essentially from the polymer melt entry opening substantially up to the polymer melt exit opening.

5. The buffer tank according to claim 1, wherein a wall is formed in the compensation chamber at least sectionwise by a piston being movable in the buffer tank.

6. The buffer tank according to claim 5, wherein at the side of the piston facing away from the compensation chamber, a fluid-filled piston chamber is provided with a fluid supply line and a fluid discharge line, the piston chamber being actuable with an adjustable pressure.

7. The buffer tank according to claim 5, wherein the piston is connected to a displacement sensor by which a signal is output for calculating the volume of the compensation chamber.

8. The buffer tank according to claim 5, wherein the piston is acted upon with a spring force produced by a mechanical spring.

9. The buffer tank according to claim 5, wherein the polymer melt entry opening and/or the polymer melt exit opening is/are arranged in the compensation chamber to be opposite to the piston.

10. The buffer tank according to claim 1, wherein the compensation chamber is an annular chamber.

11. The buffer tank according to claim 10, wherein the piston is an annular piston.

12. The buffer tank according to claim 10, wherein the polymer melt entry opening and the polymer melt exit opening are arranged on diametrically opposite regions of the annular chamber.

13. The buffer tank according to claim 12, wherein the polymer melt is guided through the polymer melt entry opening and/or the polymer melt exit opening substantially in the direction of an axis of symmetry of the compensation chamber into the compensation chamber.

14. The buffer tank according to claim 1, wherein the polymer melt entry opening and the polymer melt exit opening are arranged at the same side of the compensation chamber.

15. The buffer tank according to claim 1, wherein for flow optimization the compensation chamber is provided with at least one flow guiding element projecting into the flow of the polymer melt, which is smaller than the flow cross-section of the compensation chamber and by which the velocity profile in the direction of flow through the compensation chamber is made uniform at least in sections in that the flow guiding element is arranged in a region of the compensation chamber in which in the absence of a flow guiding element a drop in velocity occurs relative to the core flow of the compensation chamber.

16. The buffer tank according to claim 15, wherein the fast core flow of the flow through the compensation chamber is guided by the flow guiding element towards a region in which in the absence of a flow guiding element a flow is observed that is slowed down in comparison with the core flow.

17. The buffer tank according to claim 15, wherein the flow guiding element is arranged in a region of the compensation chamber in which the flow through the compensation chamber has a strong curvature.

18. The buffer tank according to claim 15, wherein the flow guiding element is arranged on the wall of the compensation chamber which is opposite to the polymer melt entry opening and/or the polymer melt exit opening.

19. The buffer tank according to claim 18, wherein the flow guiding element has substantially the form of a radially symmetrical nose oriented towards the flow entry opening.

20. The buffer tank according to claim 19, wherein the nose is arranged on the piston.

21. The buffer tank according to claim 15, wherein the flow guiding element is substantially in the form of a blade or wing.

22. The buffer tank according to claim 1, wherein the compensation chamber has a flow cross-section which forms at least one corner.

23. The buffer tank according to claim 22, wherein the flow guiding element is arranged in the region of the corner, and the corner flow formed during flow through the compensation chamber is made uniformly by the flow guiding element.

24. A kit consisting of an extrusion machine for extruding a polymer melt, at least one pump means for conveying the polymer melt to the extrusion machine and a buffer tank according to claim 1.

* * * * *